(12) United States Patent
Li et al.

(10) Patent No.: US 9,965,671 B2
(45) Date of Patent: May 8, 2018

(54) MATERIAL IDENTIFYING SYSTEM AND RELATED IDENTIFYING METHOD

(71) Applicant: HIMAX TECHNOLOGIES LIMITED, Tainan (TW)

(72) Inventors: Jui-Ni Li, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 52 days.

(21) Appl. No.: 15/193,124

(22) Filed: Jun. 27, 2016

(65) Prior Publication Data

US 2017/0372125 A1  Dec. 28, 2017

(51) Int. Cl.
*G06K 9/28* (2006.01)
*G06K 9/00* (2006.01)

(52) U.S. Cl.
CPC ...... *G06K 9/00114* (2013.01); *G06K 9/00087* (2013.01)

(58) Field of Classification Search
CPC .......... G06K 9/00906; G06K 9/00107; G06K 9/0012; G06K 9/0002; A61B 5/0531
See application file for complete search history.

(56) References Cited

U.S. PATENT DOCUMENTS

| 5,077,803 | A | * | 12/1991 | Kato | A61B 5/1172 356/71 |
| 7,657,066 | B2 | * | 2/2010 | Foundeur | G06K 9/00013 340/5.52 |
| 7,848,798 | B2 | * | 12/2010 | Martinsen | A61B 5/0531 340/5.83 |
| 2001/0005424 | A1 | * | 6/2001 | Marksteiner | A61B 5/0531 382/124 |

FOREIGN PATENT DOCUMENTS

| CN | 1720001 A | 1/2006 |
| CN | 101889866 B | 2/2012 |
| CN | 103364451 B | 1/2016 |
| JP | 2005143804 | 6/2005 |
| WO | WO 2016194358 A1 * | 12/2016 ............. A61B 5/053 |

* cited by examiner

*Primary Examiner* — Brian Werner
(74) *Attorney, Agent, or Firm* — Winston Hsu

(57) ABSTRACT

A material identifying system includes an identifying panel, a voltage source and a determining circuit. The voltage source is arranged to transmit a voltage signal to an object to be identified via the identifying panel in order to obtain an impedance of the object, wherein the voltage source adjusts a frequency of the voltage signal in a predetermined range to find a specific frequency in the predetermined range where the impedance of the object is minimum. The determining circuit is arranged to determine if the specific frequency of the object to be identified matches any specific frequency of a plurality of known materials in order to identify a material of the object.

6 Claims, 7 Drawing Sheets

MATERIAL IDENTIFYING SYSTEM AND RELATED IDENTIFYING METHOD

BACKGROUND OF THE INVENTION

1. Field of the Invention

The present invention relates to a material identifying system.

2. Description of the Prior Art

Fingerprint identification is widely applied to electronic devices, such as tablets and smartphones. Conventional fingerprint identification cannot provide an efficient way to distinguish between a user's fingerprint or a non-human material formed in the shape of a user's fingerprint. It is therefore possible for a criminal to overcome the fingerprint identification and break into the electronic device.

SUMMARY OF THE INVENTION

One of the objectives of the present invention is to provide a material identifying system and a related identifying method to solve the above problem.

According to an embodiment of the present invention, a material identifying system is disclosed, wherein the system comprises an identifying panel, a voltage source and a determining circuit. The voltage source is arranged to transmit a voltage signal to an object to be identified via the identifying panel in order to obtain an impedance of the object, wherein the voltage source adjusts a frequency of the voltage signal in a predetermined range to find a specific frequency in the predetermined range where the impedance of the object is minimum. The determining circuit is arranged to determine if the specific frequency of the object to be identified matches any specific frequency of a plurality of known materials in order to identify a material of the object.

According to an embodiment of the present invention, a material identifying method is disclosed, wherein the method comprises transmitting a voltage signal to an object to be identified via an identifying panel in order to obtain an impedance of the object; adjusting a frequency of the voltage signal in a predetermined range to find a specific frequency in the predetermined range where the impedance of the object is at a minimum; and determining if the specific frequency of the object to be identified matches any specific frequency of a plurality of known materials in order to identify the material.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
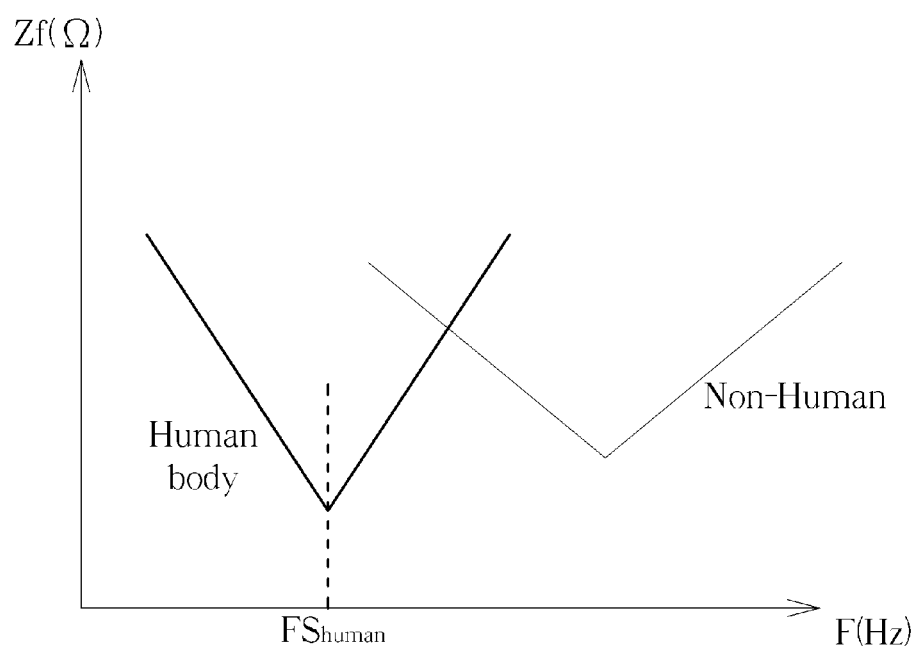
FIG. 1 is a diagram illustrating the impedance of a human body and a non-human object against frequency according to an embodiment of the present invention.

FIG. 1 is a diagram illustrating the impedance of a human body and a non-human object against frequency according to an embodiment of the present invention. As shown in FIG. 1, the impedance of a material, no matter whether human or not, changes with frequency. Most materials have similar characteristic curves of impedance against frequency, as shown in FIG. 1. Taking the human body as an example, different people might have different minimum impedances in a predetermined range; however, the specific frequencies where the minimum impedance of every individual occurs are typically the same (i.e. the frequency $FS_{human}$ shown in FIG. 1). Therefore, if a system has data of the specific frequency of every material where minimum impedance occurs, a material identifying system can be implemented based on this phenomenon.

Figure 2:
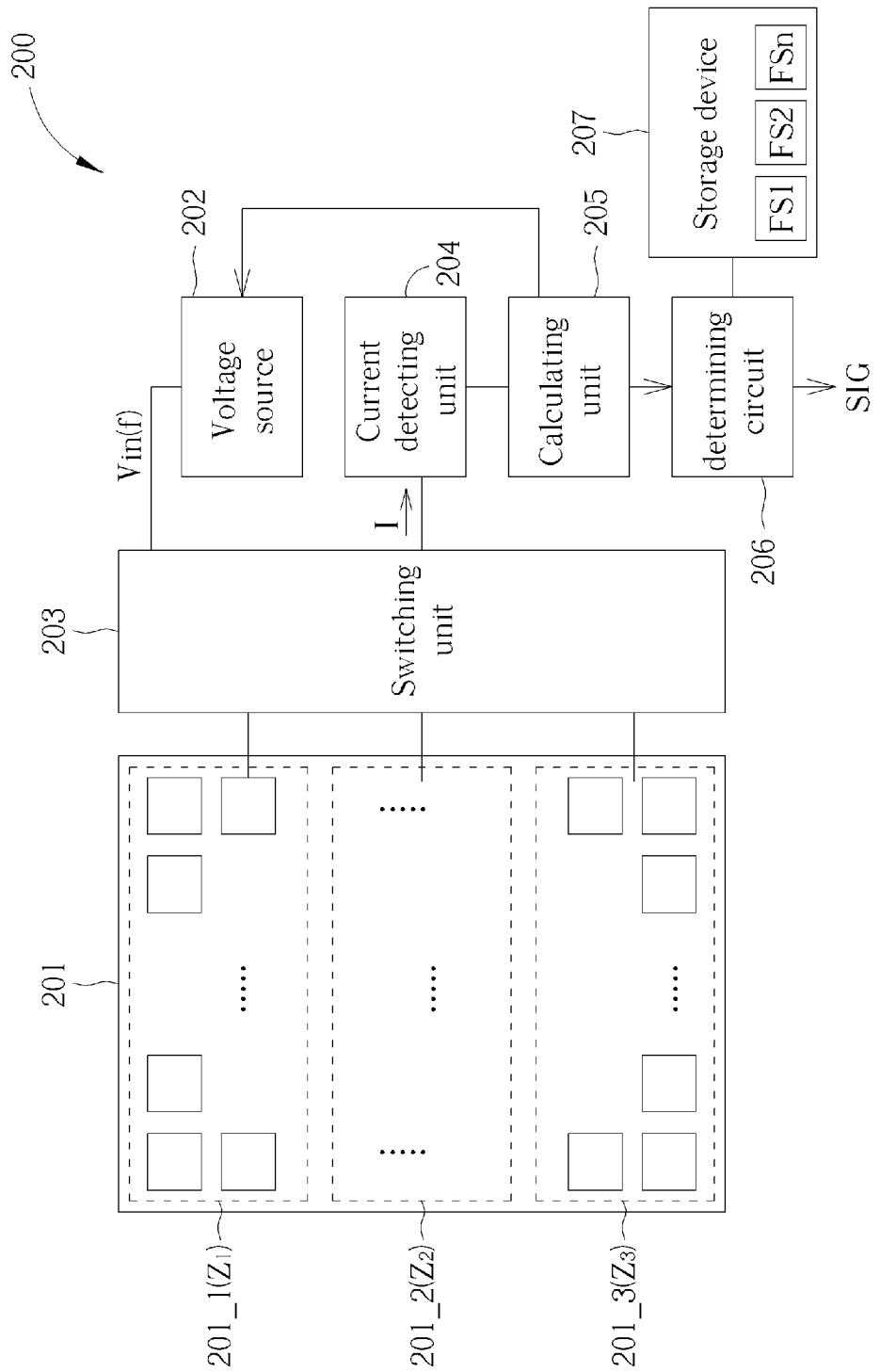
FIG. 2 is a diagram illustrating a material identifying system according to an embodiment of the present invention.

FIG. 2 is a diagram illustrating a material identifying system 200 according to an embodiment of the present invention. The material identifying system 200 comprises an identifying panel 201, a voltage source 202, a switching unit 203, a current detecting unit 204, a calculating unit 205, a determining circuit 206 and a storage device 207. The identifying panel 201 comprises electrode sectors 201_1-202_3 each having different respective impedance Z1-Z3. It should be noted that the number of electrode sectors in the identifying panel 201 is only for illustrative purposes, rather than a limitation of the present invention. The identifying panel 201 may comprise a plurality of electrode sectors 201_1-201_n, wherein the specific number of electrode sectors in the identifying panel 201 only affects the resolution of the detected impedance. The voltage source 202 is arranged to generate a voltage signal Vin with a frequency f to the identifying panel 201 via the switching unit 203. The switching unit 203, coupled between the identifying panel 201 and the voltage source 202, is arranged to control the electrode sectors 201_1-201-3 to receive the voltage signal Vin. The current detecting unit 204 is arranged to detect a current I passing through an object to be identified. The calculating unit 205 is arranged to calculate the impedance of the object according to the voltage signal Vin and the current I, and to inform the voltage source 202 to adjust the frequency of the voltage signal Vin until a specific frequency FS of the object to be identified is found. The specific frequency FS is a frequency at which a minimum impedance occurs. The determining circuit 206 is arranged to determine if the specific frequency FS of the object to be identified matches any specific frequencies of a plurality of known materials FS1-FSn stored in the storage device 207 in order to identify the material of the object. The detailed description of detecting impedance will be discussed in the following paragraphs.

It should be noted that the material identifying system provided by the present invention is not limited to detecting a specific material by accessing specific frequencies of known materials. Another application is a human body detecting mechanism for a fingerprint identification system. The following illustrates an impedance detecting mechanism of a human body according to an embodiment of the present invention.

Figure 3:
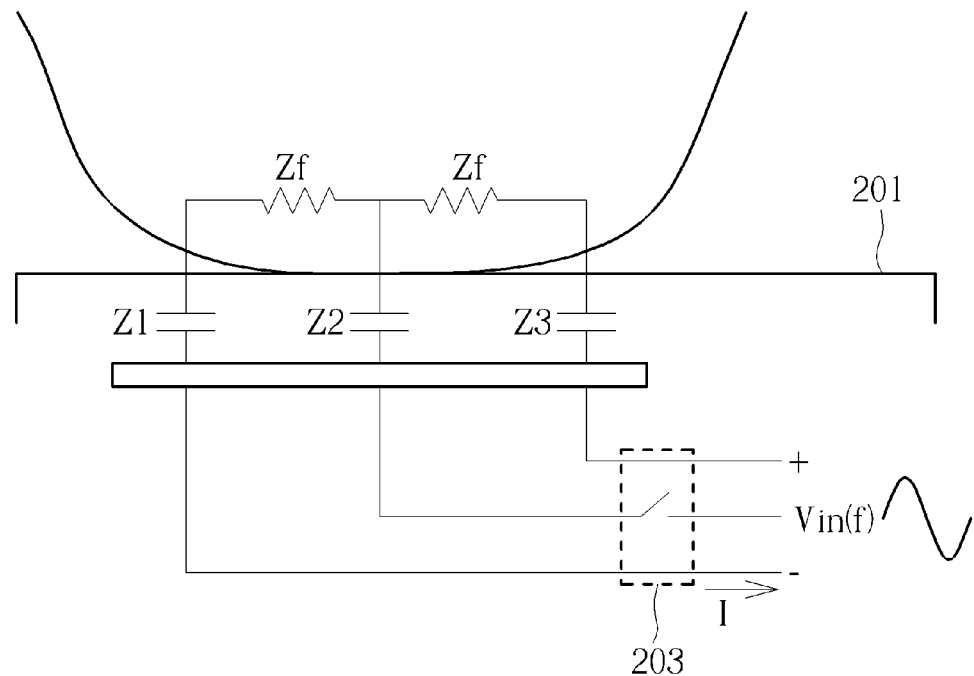
FIG. 3 is a diagram illustrating calculation of the impedance of a human body according to an embodiment of FIG. 2.

FIG. 3 is a diagram illustrating the calculation of impedance of a human body according to an embodiment of FIG. 2. As shown in FIG. 3, when a finger of a user touches the identifying panel 201, the switching unit 203 controls the electrode sector 201_2 to open, and the switching unit 203 controls the voltage signal Vin with frequency f to pass through a path composed of the electrode sectors 201_1 and 201_3 (represented by the impedances Z1 and Z3) and the impedance of a human body (represented by the impedance Zf). By using the current detecting unit 204 to detect the current I which passes through the human body, the impedance of a human body can be easily calculated by the calculating unit 205 using Ohm's law. The equation is given below:

$$Vin(f)=I^*(Z1+Z3+2Zf)$$

Figure 4:
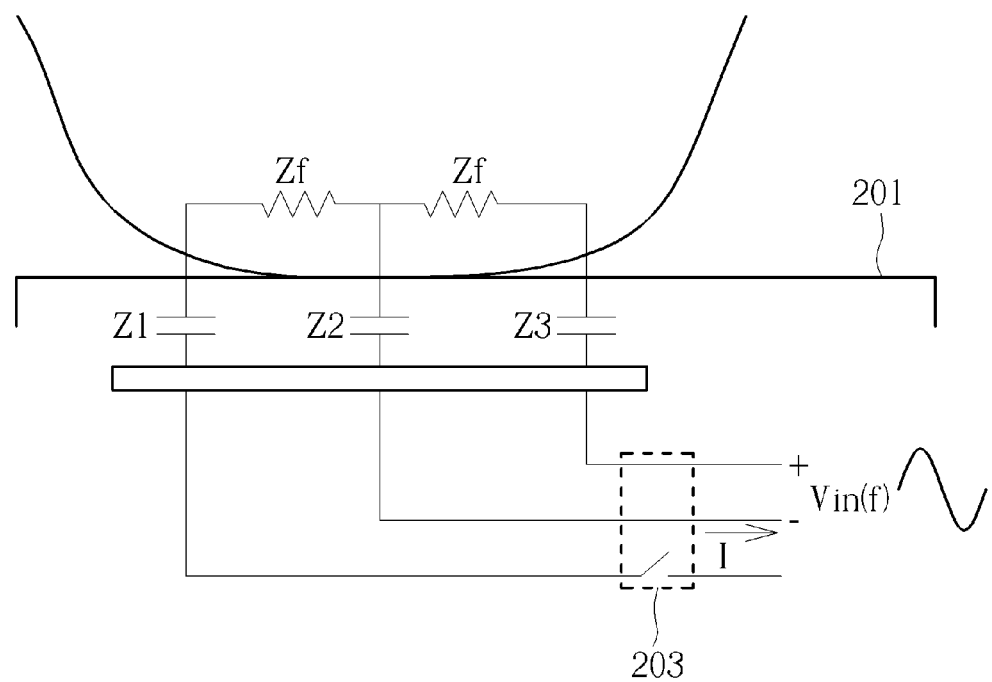
FIG. 4 is a diagram illustrating calculation of the impedance of a human body according to another embodiment of FIG. 2.

FIG. 4 is a diagram illustrating the calculation of the impedance of a human body according to another embodiment of FIG. 2. As shown in FIG. 4, when a finger of a user touches the identifying panel 201, the switching unit 203 controls the electrode sector 201_1 to open, and the switching unit 203 controls the voltage signal Vin with the frequency f to pass through a path composed of the electrode sectors 201_2 and 201_3 (represented by the impedances Z2 and Z3) and the impedance of a human body (represented by the impedance Zf). By using the current detecting unit 204 to detect the current I which passes through the impedance of a human body Zf, the impedance of the human body can be easily calculated by the calculating unit 205 using Ohm's law. The equation is given below:

$$Vin(f)=I^*(Z2+Z3+Zf)$$

Figure 5:
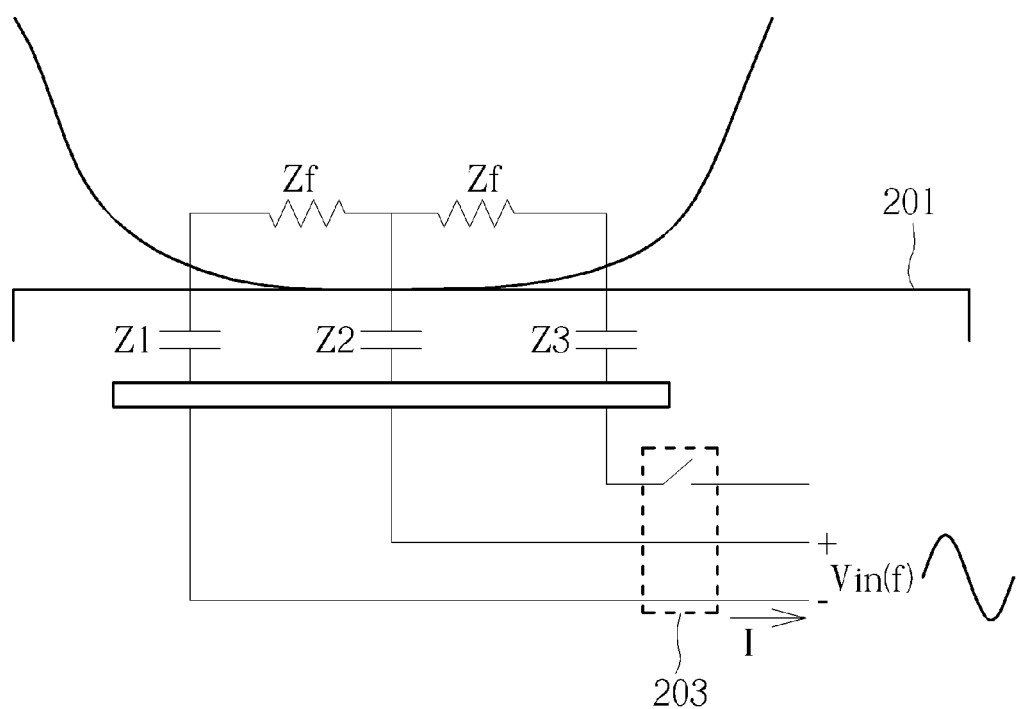
FIG. 5 is a diagram illustrating calculation of the impedance of a human body according to another embodiment of FIG. 2.

FIG. 5 is a diagram illustrating calculation of the impedance of a human body according to yet another embodiment of FIG. 2. As shown in FIG. 5, when a finger of a user touches the identifying panel 201, the switching unit 203 controls the electrode sector 201_3 to open, and the switching unit 203 controls the voltage signal Vin with the frequency f to pass through a loop composed of the electrode sectors 201_1 and 201_2 (represented by the impedances Z1 and Z2) and the impedance of a human body (represented by the impedance Zf). By using the current detecting unit 204 to detect the current I which passes through the impedance of a human body Zf, the impedance of the human body can be easily calculated by the calculating unit 205 using Ohm's law. The equation is given below:

$$Vin(f)=I^*(Z1+Z2+Zf)$$

As mentioned above, the number of electrode sectors in the identifying panel 201 only affects the resolution of the detected impedance. The more electrode sectors used, the more accurate the detected impedance Zf. For example, three impedances Zf for the same frequency are calculated according to the embodiments shown in FIGS. 3-5, and an average of the three impedances Zf is calculated to serve as a final impedance Zf of the object. After the minimum impedance of the object to be identified is obtained by adjusting the frequency f of the voltage signal Vin, the determining circuit 206 determines if the specific frequency FS where the minimum impedance occurs matches any specific frequency of a plurality of known materials FS1-FSn stored in the storage device 207 in order to identify the material of the object. If the material identifying system 200 is implemented specifically for detecting a human body, after the object is confirmed as a human body, the determining circuit 206 can send a signal SIG to inform the identifying system 200 to start a fingerprint recognition process, which uses a plurality of sensors within the identifying panel 201 to determine a fingerprint pattern for further fingerprint recognition. By checking the object first, the security of the devices can be greatly improved.

Figure 6:
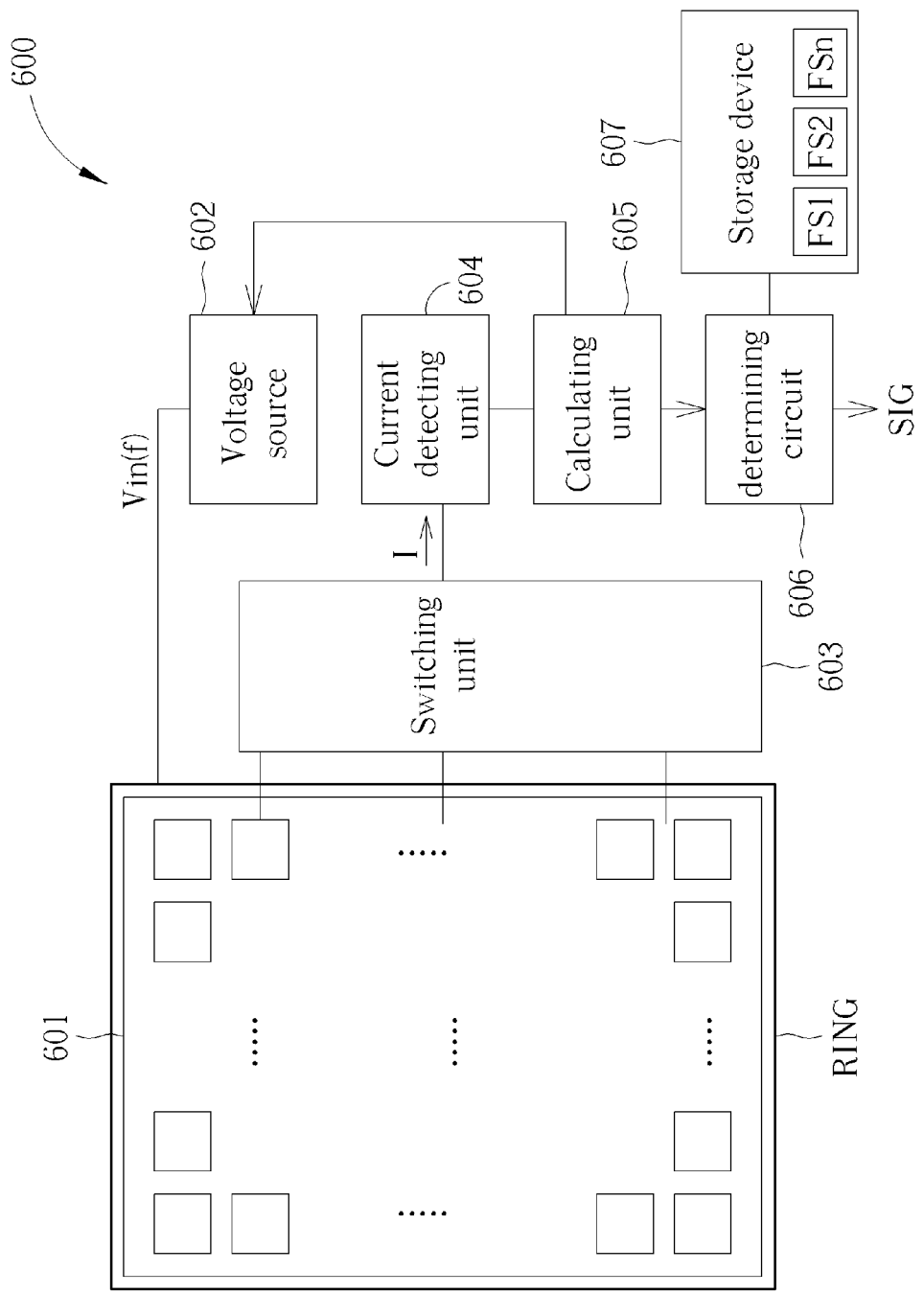
FIG. 6 is a diagram illustrating a material identifying system according to another embodiment of the present invention.

FIG. 6 is a diagram illustrating a material identifying system 600 according to another embodiment of the present invention. As shown in FIG. 6, the material identifying system 600 comprises a metal ring RING, an identifying panel 601, the voltage source 602, the switching unit 603, the current detecting unit 604, the calculating unit 605, the determining circuit 606 and the storage device 607. The identifying panel 601 comprises the electrode sectors the metal ring RING disposed around the electrode sectors 601_1-601_3. The voltage source 602 sends the voltage signal Vin with frequency f via the metal ring RING to the identifying panel 601, and receives the signal back via the electrode sectors.

Figure 7:
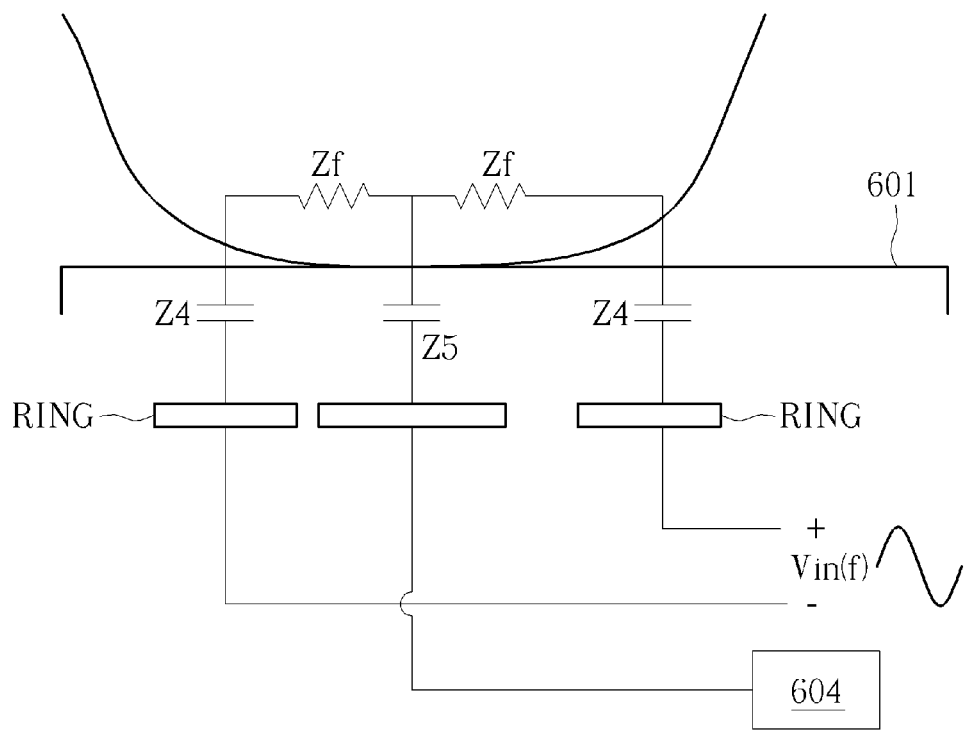
FIG. 7 is a diagram illustrating calculation of the impedance of a human body according to the embodiment of FIG. 6.

FIG. 7 is a diagram illustrating calculation of impedance of a human body according to the embodiment shown in FIG. 6. The voltage signal Vin is first transmitted to the identifying panel 601 via metal rings RING1 and RING2 (represented by an impedance Z4), then passes through the impedance of a human body (represented by the impedance Zf) to an equivalent impedance Z5 of the identifying panel 601. In this embodiment, Those skilled in the art can readily understand that the switching unit 203 can control any electrode sectors to be opened in order to change the equivalent impedance Z5, or control the electrode sectors to remain closed. In this way, the electrode sectors in the identifying panel are considered as a single impedance. By using the current detecting unit 204 to detect the current I which passes through the impedance of a human body Zf, the impedance of the human body can be easily calculated by the calculating unit 205 using Ohm's law. The equation is given below:

$$Vin(f)=I^*(2Zf+Z4Z5)$$

It should be noted that the voltage signal Vin is an alternating current voltage with a frequency F; therefore, the transmission path of the voltage signal Vin as shown in FIGS. 3, 4, 5 and 7 can be reversed. For example, the voltage signal Vin shown in FIG. 7 can first pass through the electrode sectors to the object to be identified, and then pass through the metal ring RING.

Figure 8:
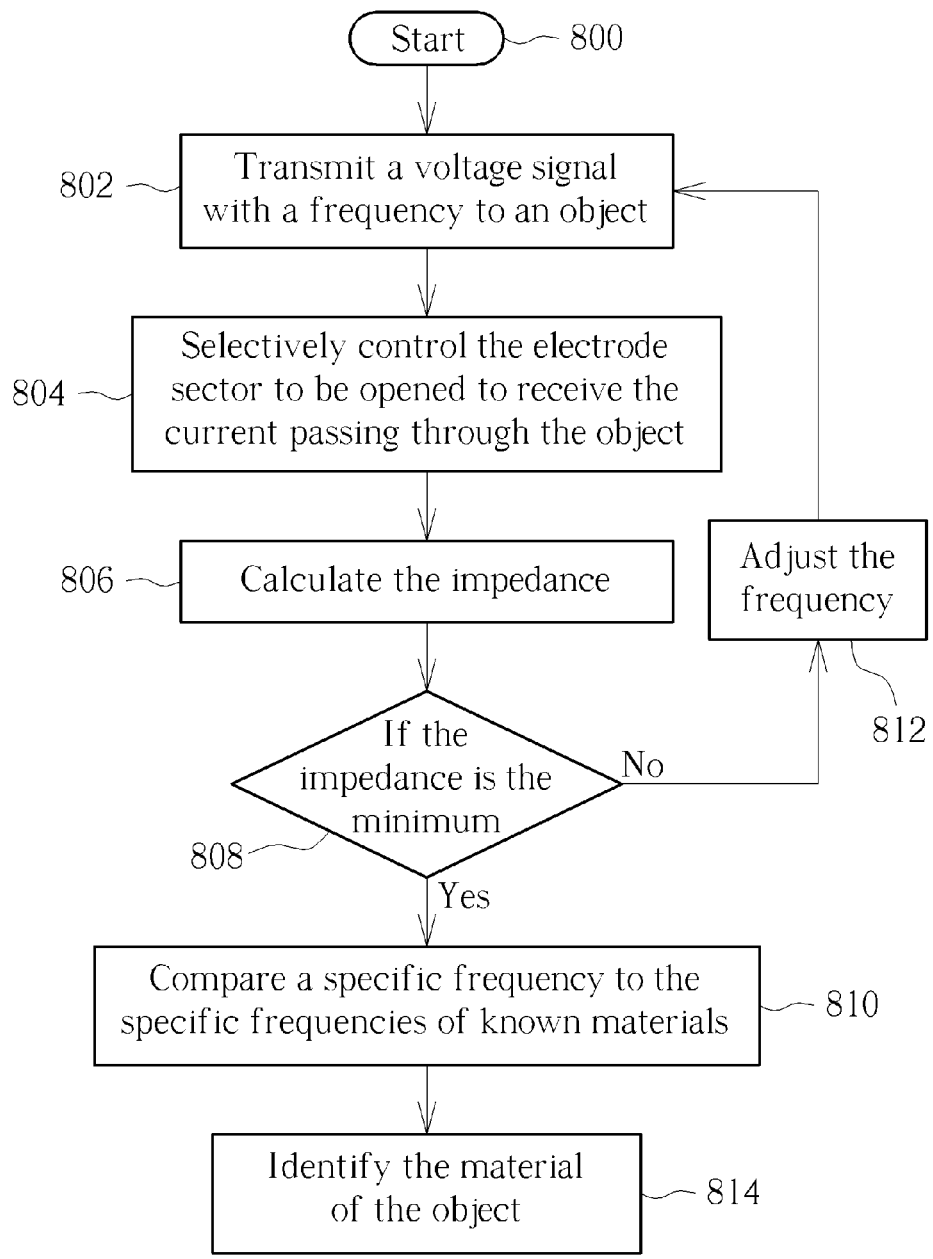
FIG. 8 is a flowchart illustrating the material identifying method according to an embodiment of the present invention.

FIG. 8 is a flowchart illustrating the material identifying method according to an embodiment of the present invention. Provided that the result is substantially the same, the steps are not required to be executed in the exact order shown in FIG. 8. The material identifying method may be summarized by the following steps.

Step 800: start.

Step 802: transmit a voltage signal with a frequency to an object to be identified.

Step 804: selectively control the electrode sector to open in order to receive the current passing through the object.

Step 806: calculate the impedance of the object according to the current and the voltage signal.

Step 808: determine if the impedance is the minimum. If yes, go to step 810; otherwise, go to step 812.

Step 810: compare a specific frequency where the minimum impedance occurs with specific frequencies of known materials.

Step 812: adjust the frequency of the voltage signal.

Step 814: identify the material of the object.

Briefly summarized, the present invention discloses a material identifying system which checks a specific frequency of the object to be identified, wherein the specific frequency occurs at a minimum impedance of the object, in order to identify the material of the object.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A material identifying system, comprising:
   an identifying panel, comprising a plurality of electrode sectors;
   a voltage source, arranged to transmit a voltage signal to an object to be identified via the identifying panel in order to obtain an impedance of the object, wherein the voltage source adjusts a frequency of the voltage signal in a predetermined range to find a specific frequency in the predetermined range where the impedance of the object is minimum;
   a determining circuit, arranged to determine if the specific frequency of the object to be identified matches any specific frequency of a plurality of known materials in order to identify a material of the object;
   a metal ring, for receiving the voltage signal generated by the voltage source;
   a switching circuit, arranged to selectively control at least one of the plurality of electrode sectors to form a conducting path with the metal ring via the object;
   a current detecting circuit, for detecting a current flowing through the conducting path; and
   a calculating circuit, for calculating the impedance of the object according to the voltage signal and the detected current;
   wherein the material identifying system is applied to a human fingerprint identification system, and the identifying panel comprises a plurality of sensors for determining a pattern of a human fingerprint.

2. The material identifying system of claim 1, further comprising:
   a storage device, arranged to store the specific frequencies of the plurality of known materials.

3. The material identifying system of claim 1, wherein when the fingerprint identification system starts to operate, the material identifying system identifies the material of the object; and when the object is determined to be a human body, the fingerprint identification system starts a fingerprint recognition process; and when the object is determined to not be a human body, the fingerprint identification system does not perform the fingerprint recognition process.

4. A material identifying method, comprising:
   transmitting a voltage signal to an object by a metal ring, wherein the object is identified via an identifying panel in order to obtain an impedance of the object, and the identifying panel comprises a plurality of electrode sectors;
   adjusting a frequency of the voltage signal in a predetermined range to find a specific frequency in the predetermined range where the impedance of the object is minimum;
   determining if the specific frequency of the object to be identified matches any specific frequency of a plurality of known materials in order to identify the material;
   selectively controlling the plurality of electrode sectors to receive the voltage signal or not;
   making two of the electrode sectors form a conducting path via the object;
   detecting a current flowing through the conducting path; and
   calculating the impedance of the object between the two electrode sectors according to the voltage signal and the detected current;
   wherein the material identifying method is applied to a human fingerprint identification system.

5. The material identifying method of claim 4, further comprising:
   utilizing a storage device to store the specific frequencies of the plurality of known materials.

6. The material identifying method of claim 4, wherein when the fingerprint identification system starts to operate, the method is applied to identify the material of the object; and when the object is determined to be a human body, the fingerprint identification system starts a fingerprint recognition process; and when the object is determined to not be a human body, the fingerprint identification system does not perform the fingerprint recognition process.

* * * * *